United States Patent
Schuberth et al.

(10) Patent No.: US 9,862,272 B2
(45) Date of Patent: Jan. 9, 2018

(54) METHOD FOR OPERATING A LONGITUDINAL DRIVER ASSISTANCE SYSTEM OF A MOTOR VEHICLE AND MOTOR VEHICLE

(75) Inventors: Stefan Schuberth, Gaimersheim (DE); Ralf Held, Eichstätt (DE)

(73) Assignee: AUDI AG, Ingolstadt (DE)

(*) Notice: Subject to any disclaimer, the term of this patent is extended or adjusted under 35 U.S.C. 154(b) by 278 days.

(21) Appl. No.: 14/119,745

(22) PCT Filed: May 8, 2012

(86) PCT No.: PCT/EP2012/001966
§ 371 (c)(1),
(2), (4) Date: Feb. 12, 2014

(87) PCT Pub. No.: WO2012/159708
PCT Pub. Date: Nov. 29, 2012

(65) Prior Publication Data
US 2014/0156164 A1    Jun. 5, 2014

(30) Foreign Application Priority Data
May 25, 2011  (DE) .................. 10 2011 102 437

(51) Int. Cl.
*B60K 31/00*  (2006.01)
*B60W 30/14* (2006.01)
*B60W 30/16* (2012.01)

(52) U.S. Cl.
CPC ........... *B60K 31/00* (2013.01); *B60W 30/143* (2013.01); *B60W 30/16* (2013.01);
(Continued)

(58) Field of Classification Search
CPC ..... B60K 31/00; B60W 30/143; B60W 30/16; B60W 2550/306; B60W 2550/304; B60W 2550/302
See application file for complete search history.

(56) References Cited

U.S. PATENT DOCUMENTS

| 6,580,996 B1* | 6/2003 | Friedrich | B60K 31/0008 180/170 |
| 2003/0195703 A1* | 10/2003 | Ibrahim | B60K 31/0008 701/301 |

(Continued)

FOREIGN PATENT DOCUMENTS

| CN | 101111418 A | 1/2008 |
| CN | 101417655 A | 4/2009 |

(Continued)

OTHER PUBLICATIONS

International Search Report issued by the European Patent Office in International Application PCT/EP2012/001966 dated Jul. 24, 2012.

(Continued)

*Primary Examiner* — Mussa A Shaawat
*Assistant Examiner* — Jordan S Fei
(74) *Attorney, Agent, or Firm* — Henry M Feiereisen LLC (57) ABSTRACT

Method for operating a longitudinal driver assistance system (2) of a motor vehicle (1), which controls, in a pure follow mode, the speed of the motor vehicle (1) such that a distance to a vehicle in front as the control object remains constant, and which, in a free travel mode, controls the speed to a desired speed, a likelihood of the vehicle (14) in front of pulling out being determined depending on sensor data of at least one ambient sensor. The control with respect to the vehicle (14) in front and/or the control in the free travel mode is modified or ended directly after termination of the follow mode depending on the pulling-out likelihood.

15 Claims, 4 Drawing Sheets

(52) U.S. Cl.
CPC . *B60W 2550/302* (2013.01); *B60W 2550/304* (2013.01); *B60W 2550/306* (2013.01)

(56) References Cited

U.S. PATENT DOCUMENTS

| | | | |
|---|---|---|---|
| 2005/0251323 A1* | 11/2005 | Heinrichs-Bartscher | B60K 31/0008 701/117 |
| 2009/0055095 A1* | 2/2009 | Urban | B60W 40/02 701/301 |
| 2009/0204304 A1* | 8/2009 | Urban | B60W 40/04 701/96 |
| 2010/0036578 A1* | 2/2010 | Taguchi | B60K 31/0008 701/93 |
| 2013/0054106 A1* | 2/2013 | Schmudderich | B60W 30/0956 701/96 |

FOREIGN PATENT DOCUMENTS

| | | |
|---|---|---|
| DE | 102004013818 | 10/2005 |
| DE | 102004047084 | 3/2006 |
| DE | 102006049246 | 4/2008 |
| DE | 102007044761 | 5/2008 |
| DE | 102008061301 | 6/2009 |
| DE | 102009007885 | 8/2010 |
| DE | 102009038078 | 3/2011 |
| DE | 102010032086 | 3/2011 |
| EP | 2 287 060 | 2/2011 |
| JP | 11-039600 | 2/1999 |
| JP | 2004217175 A | 8/2004 |
| JP | 2004265238 A | 9/2004 |

OTHER PUBLICATIONS

Chinese Search Report dated Jul. 31, 2015 with respect to counterpart Chinese patent application 201280037019.2.

Translation of Chinese Search Report dated Jul. 31, 2015 with respect to counterpart Chinese patent application 201280037019.2.

* cited by examiner

METHOD FOR OPERATING A LONGITUDINAL DRIVER ASSISTANCE SYSTEM OF A MOTOR VEHICLE AND MOTOR VEHICLE

CROSS-REFERENCES TO RELATED APPLICATIONS

This application is the U.S. National Stage of International Application No. PCT/EP2012/001966, filed May 8, 2012, which designated the United States and has been published as International Publication No. WO 2012/159708 and which claims the priority of German Patent Application, Serial No. 10 2011 102 437.2, filed May 25, 2011, pursuant to 35 U.S.C. 119(a)-(d).

BACKGROUND OF THE INVENTION

The invention relates to a method for operating a longitudinal driver assistance system of a motor vehicle, which controls the speed of the motor vehicle in a pure follow mode so that a distance to a preceding vehicle as the control object remains constant, and which controls in a free-driving mode to a desired speed, and a motor vehicle with such a driver assistance system.

Such longitudinal driver assistance systems are already known in the art. They control the operation of the motor vehicle at least partly automatically through automatic braking or acceleration interventions. A simple longitudinal driver assistance system is the so-called cruise control system (CCS), also referred to as Tempomat. In this case, the driver can set a desired speed, which is then automatically maintained as closely as possible by the driver assistance system.

As an extension of this basic idea, longitudinal driver assistance systems with a so-called follow controller, frequently referred to as ACC systems (Adaptive Cruise Control), have been proposed. The driver's desired speed is here not only regulated in a free-driving mode, but it is also monitored whether a preceding vehicle is present. When this is the case, in particular within a control distance, frequently a time gap, that can optionally also be adjusted by the driver, a change is made to a pure follow mode, wherein the speed of the vehicle is adjusted so that the distance to the preceding vehicle corresponds to the control distance. The preceding vehicle, in relation to which the speed is controlled, is also referred to as control object.

The control object may be determined, for example, with a so-called plausibility method. Objects driving in front of the motor vehicle are hereby determined and evaluated based on criteria. For example, it is known to calculate a vehicle path that corresponds to a most likely future trajectory of the motor vehicle, and to exclude from consideration all objects located outside the vehicle path, wherein the closest object in the direction of travel of the vehicle along the vehicle path is then frequently selected as a the control object. The reverse process, i.e. the loss of the control object and thus the termination of the follow mode, is often referred to as deplausibilization of the control object since its plausibility as a control object drops, for example, below a threshold value, or the object is no longer detected, for example due to a lane change or a measurement error.

To deplausibilize a preceding vehicle pulling out of the travel lane of the host vehicle, the control object is lost when the preceding vehicle leaves the vehicle path. Only at this point is the vehicle accelerated again to the desired speed as comfortable as possible, after transitioning into the free-driving mode. However, this causes the following problem. When driving behind another vehicle that passes a preceding vehicle as the control object and when approaching a gap in which the passing preceding vehicle provides the own vehicle with an opportunity to pass, the own acceleration is usually so late and so sluggish that the gap of the other vehicle, the former control object, has again become too small, so that the driver of this motor vehicle changes lanes again and the own vehicle, because the distance has become smaller, clearly keeps away by braking in order to create the control distance and thus requires more time to transition to acceleration after the next passing maneuver at the next gap. This effect can repeat until there is a long gap, which is sufficient for passing the former control object even with the delayed acceleration. This does not correspond in any way to the driver's expectation because it is easier from his experience to recognize a vehicle as pulling out, whereupon he can accelerate significantly earlier, even when the preceding vehicle is still in the driver's lane.

SUMMARY OF THE INVENTION

It is therefore the object of the invention to improve a method for operating a longitudinal driver assistance system, in particular an ACC system, so as to better respond to a vehicle pulling out and to especially improve the chance for a successful passing maneuver.

This object is attained according to the invention with a method of the above-mentioned type by determining a pulling-out probability of the preceding vehicle as a function of sensor data from at least one environment sensor, wherein the control relative to the preceding vehicle and/or in free-driving mode is modified immediately after the completion of the follow mode depending on the pulling-out probability, or the control relative to the preceding vehicle is terminated.

The host (own) motor vehicle, specifically the driver assistance system, hence performs an early control response to vehicles pulling out at close range. The driver assistance system, particularly the ACC system, determines a pulling-out probability for a preceding vehicle and, depending on this quantity, reacts to the vehicle that is actually still classified as a control object. This enhances the satisfaction for the user of the driver assistance system and allows a faster and more dynamic response to vehicles pulling out, with the technical measures depending on the behavior of the driver, which means that there is an expected reaction which in particular allows a passing maneuver when the preceding vehicle "makes room".

It should be noted here that the inventive method is performed automatically in all embodiments, in particular by the controller of a driver assistance system, where it is realized with the appropriate software and/or electronic components.

As already mentioned, the method of the invention relates to the case where the preceding vehicle is actually still a plausible control object in the follow mode, wherein several possibilities exist for a concrete reaction.

For example, the follow mode is terminated immediately when the pulling-out probability exceeds a deplausibility threshold value. When the pulling-out probability is very high or even absolutely certain, the preceding control object can be directly deplausibilized. Here, the deplausibility threshold value may be in particular 70-95%, preferably 80%. It makes sense here to define a high probability, because a faulty conclusion of the follow mode, i.e. a faulty deplausibilization, can exert a very uncomfortable acceleration towards the preceding vehicle which would necessitate a driver intervention. Nevertheless, it is possible with this configuration, even with a wide vehicle path, which does not yet give rise to deplausibilization when using the conventional algorithms, to still deplausibilize when the probability for pulling-out is high so as to allow a dynamic response to the pulling out maneuver.

In another specific embodiment of the present invention, a control distance to the preceding vehicle may be decreased and/or a positive acceleration value may be added to an acceleration request determined by the driver assistance system in follow mode, when the pulling-out probability exceeds a preparation threshold value and when a speed of the preceding vehicle is lower than the desired speed. Such preparation threshold value which ultimately indicates when the additional pulling-out function of the present invention becomes active, may be for example 40-60%, preferably 50%. An early control action can therefore be carried out in response to a smaller, but still relatively safe pulling-out probability. The follow mode is thus actually modified with respect to an impending pulling out, thereby supporting a faster response to a vehicle pulling out. Here, the distance to the control object can be decreased or a value may be added to an acceleration or torque demand on the engine or braking system, wherein specifically the control distance may be reduced and/or the acceleration value may be selected as a function of the current distance to the preceding vehicle, and/or the pulling-out probability. Consequently, the reaction may be stronger for a high pulling-out probability than for a rather small pulling-out probability. In this case, the actual distance to the control object may also be considered since collisions must be safely prevented.

In a particularly advantageous embodiment of the present invention, when the pulling-out probability exceeds a situation threshold value at the end of the follow mode, a faster change into an acceleration mode of the motor vehicle may be requested and/or the acceleration request may be increased. When deplausibilization actually occurs and when the pulling-out probability exceeds the situation threshold value of, for example, 40-60%, preferably 50%, a faster change from brake to drive can be performed with this type of object deplausibilization and/or a higher acceleration can be requested than with another object deplausibilization, which may occur for example due to a fault, such as a sensor failure. Here, the knowledge is exploited that it is quite likely that the object was deplausibilized because it pulled out. Therefore, in order to enable the fastest possible passing maneuver, for example a higher acceleration may be requested by switching from a normally used "comfort measure", i.e. a maximum acceleration chosen for sake of comfort, to higher accelerations. Furthermore, the speed with which the acceleration changes may be changed, i.e. steeper gradients may be selected, and the like. In this way, a more dynamic reaction after deplausibilization is possible, based on the actually existing situation. It should also be noted at this point that in addition other criteria may be provided to actually enable such changes in response to a deplausibilization, for example, a criterion that relies on the length of a gap in a lane into which the vehicle that pulls out changes, and the like.

One or more algorithms that process sensor data may be used for actually determining the pulling-out probability, wherein different possibilities exist when using several different algorithms to determine a final pulling-out probability. For example, the different algorithms may each contribute to the pulling-out probability, with the total pulling-out probability ultimately resulting as a sum of these contributions. However, it is also possible to use a logic that combines the pulling-out probabilities outputted by the various algorithms into a total pulling-out probability, for example by an averaging or weighting process. In the following, different approaches for determining a pulling-out probability will be discussed, which can advantageously be realized in the method of the invention either alone or in combination.

In a particularly advantageous embodiment of the present invention, a situation analysis may be performed for determining the pulling-out probability, in particular with respect to a passing maneuver by the preceding vehicle and/or a preceding vehicle travelling, without motivation, in the left lane for right hand traffic or in the right hand lane for left hand traffic. More particularly, situations can be detected, in which one approaches or already follows a preceding vehicle that either just passes another road user or travels, without motivation, in an outer lane, with no other road users travelling in front of the preceding vehicle. When no other road user is present in the right lane for right hand traffic or in the left lane for left hand traffic and/or when the passing maneuver is clearly complete or when the control object was, without motivation, in the actual travel lane of the motor vehicle, it is likely that the control object pulls out to the right for right hand traffic or the left for left hand traffic. In such considerations, lane data about the travel lane currently traveled by the motor vehicle and the total number of lanes of the road traveled and/or road user data, in particular a travel lane, and/or speed and/or position of other preceding road users may be advantageously determined for the situation analysis. For this purpose, for example, the data from radar sensors and/or from a camera may be used as environment sensors, whereby for example the same base can be used that was already used for a plausibility check of a control object, because in this context objects located and/or traveling in front of the vehicle is detected and classified. The only prerequisite is that a sensor, in particular a radar sensor, is provided which can detect a further object in front of a detected object, for example the radar radiation which can propagate underneath the directly preceding vehicle and detect the preceding vehicle. Today's radar sensors and evaluating vehicle systems are already able to accomplish this. Consequently, the knowledge of other road users as detected objects and their properties, i.e. the road user data, allows a situation analysis, which considers in particular the own lane and/or adjacent lane to the right for right hand traffic and the adjacent lane to the left for left hand traffic. To view this lane assignment, it must at least be possible to determine another lane on the right side for right hand traffic or on the left side for left hand traffic, which is possible, for example, by a statement about one's own lane and the road, i.e. lane data; however, the fact that a detected object is currently passed or was passed, is also a clear indication of the existence of such a lane. Such a situation analysis thus more particularly enables forward-looking control, because situations in which a control object is likely to pull out, can be identified intentionally and ahead of time, thus allowing an appropriate response. For example, the pulling-out probability may be increased and/or set to a higher fixed value when the situation analysis, in particular by considering a trajectory of the position of the preceding vehicle and at least one additional road user who was passed by another vehicle or has passed another vehicle, shows that the preceding vehicle has completed the passing maneuver and can merge into the right lane for right hand traffic or can merge into the left lane for left hand traffic, and/or when the situation analysis shows that the preceding vehicle travels in the lane of the motor vehicle in spite of an empty right lane for right hand traffic or an empty left lane for left hand traffic. For example, a defined pulling-out probability or a specific defined value by which the pulling-out probability is increased may then be provided, for example a value of 50%. In a further advantageous development of this situation analysis, when a detected preceding vehicle travels in the lane of the vehicle in spite of an empty right lane for right hand traffic or an empty left lane for left hand traffic, the pulling-out probability may be increased or set to a higher value only for a specified period of time, in particular 2 to 4 seconds, preferably 3 seconds, and thereafter reduced, in particular via a ramp. In this way, incorrect responses to notorious left lane drivers in right hand traffic or to notorious drivers who do not leave the lane after a passing maneuver are advantageously avoided. Thus, the pulling-out probability or the value can be kept constant for a defined time, for example 3 seconds, and thereafter reduced via a ramp.

A pulling-out probability and/or a value associated with a pulling-out probability may also be determined by determining the pulling-out probability by considering an overlap between the traveled lane and the preceding vehicle. When the preceding vehicle is completely in its own lane bounded by the lane markers, it can be assumed that the pulling-out probability is very low because of this feature. If the object migrates toward and traverses the lane marker, then a higher pulling-out probability can assumed. This is the basic idea for this approach, which may be implemented by determining the overlap from a comparison of the angle from a sensor that measures the object to the two rear outer edges of the preceding vehicle with the angle to lane markers, in particular in an image of a camera, located at the same distance where the distance between the edges was measured. The overlap can then be calculated from the edge angle of the object and an angle from the relevant lane marker to the opposite edge of the object, which can be measured for example by a video camera. When a car pulls out in front of the own vehicle to the right for right hand traffic or to the left for left hand traffic, the left or right edge of the object approaches the left or right lane marker. This approach must be detectable to calculate a pulling-out probability. By using the angle, a percentage overlap between the preceding vehicle, i.e. the control object, and the own lane can be calculated. For this purpose, for the example of right hand traffic, the angle from the left edge of the object to the right line through the difference angle is calculated from the two edge angles of the object. An overlap determined in this way or otherwise may affect the pulling-out probability, wherein in an advantageous embodiment of the present invention, the mapping of the overlap on the pulling-out probability and/or an increase in the pulling-out probability is at least partially linear, wherein the pulling-out probability increases with decreasing overlap. The pulling-out probability can therefore be assumed to be a linearly decreasing characteristic curve as a function of the overlap.

According to a further possibility of an algorithm for determining a pulling-out probability, a transverse speed of the preceding vehicle may be measured, wherefrom a position, in particular a transverse position, of the preceding vehicle may be predicted after a predetermined period of time, preferably 2 to 4 seconds, and the pulling-out probability may be determined taking into account the predicted position. When in particular the preceding vehicle is still in the travel path, the object can be placed farther to the outside through a prediction of the transverse speed in a suitable predetermined period of time, for example several seconds. It then becomes evident whether the preceding vehicle, i.e. the control object, moves so as to suggest a pulling-out maneuver. Assuming now a driver assistance system that basically works with a travel path to check the plausibility, i.e. when for determining the control object a plausible value for a detected preceding object is determined based on a travel path, according to an advantageous embodiment of the present invention, the pulling-out probability may be determined by taking into consideration a plausibility value with respect to the predicted position, in particular for a plausibility value indicating a probability the value of one minus the plausibility value. A new object plausibility for the predicted position can be calculated using the already calculated vehicle path, wherein the opposite of the plausibility for the predicted position can be assumed as the pulling-out probability.

In a further development of the invention, when a preconditioning threshold value for pulling-out probability is exceeded, the operating parameters of at least one other vehicle system may be adjusted with respect to faster acceleration of the motor vehicle at the conclusion of the follow mode. It is therefore also within the scope of the invention to perform additionally a preconditioning of various vehicle-related systems, for example the engine, an ESP system and the like, in order to enable a faster and more dynamic reaction when a vehicle pulls out.

In addition to the method, the invention also relates to a motor vehicle, with a longitudinal driver assistance system and a controller configured to carry out the method of the invention. All embodiments with respect to the inventive method can likewise be applied to the motor vehicle according to the invention, so that the already described advantages can also be achieved with the motor vehicle.

BRIEF DESCRIPTION OF THE DRAWING

Further advantages and details of the present invention will become apparent from the exemplary embodiments described hereinafter and from the drawings, which show in.

DETAILED DESCRIPTION OF PREFERRED EMBODIMENTS

Figure 1:
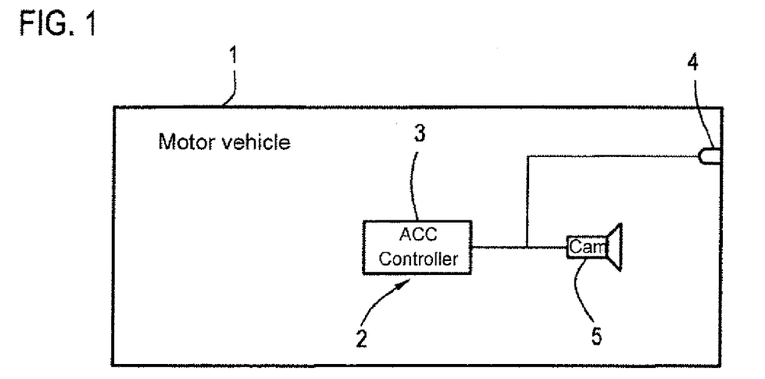
FIG. 1 a schematic diagram of a motor vehicle according to the invention.

FIG. 1 shows a schematic diagram of a motor vehicle 1 according to the invention. It includes a longitudinal driver assistance system 2, which is configured here as an ACC system and controls in a free-driving mode to a desired speed and controls in a pure follow mode to a preceding vehicle as the control object with a preset controlled distance or a selected controlled distance set by the driver. The operation of the driver assistance system 2 is controlled by a control device 3 which is also configured to perform the method according to the invention. The output of the inventive driver assistance system 2 is an acceleration request, which may of course also be negative so that the engine and the braking system of the motor vehicle 1 are controlled accordingly.

The basic function of an ACC system with regard to the follow mode and free-driving mode need not be described here in detail since it is already known in the art. However, within the context of the invention, the control device 3 is also configured to determine a pulling-out probability for a preceding vehicle based on sensor data from environment sensors. In the present example, a radar sensor 4 and a camera 5 are shown.

Figure 2:
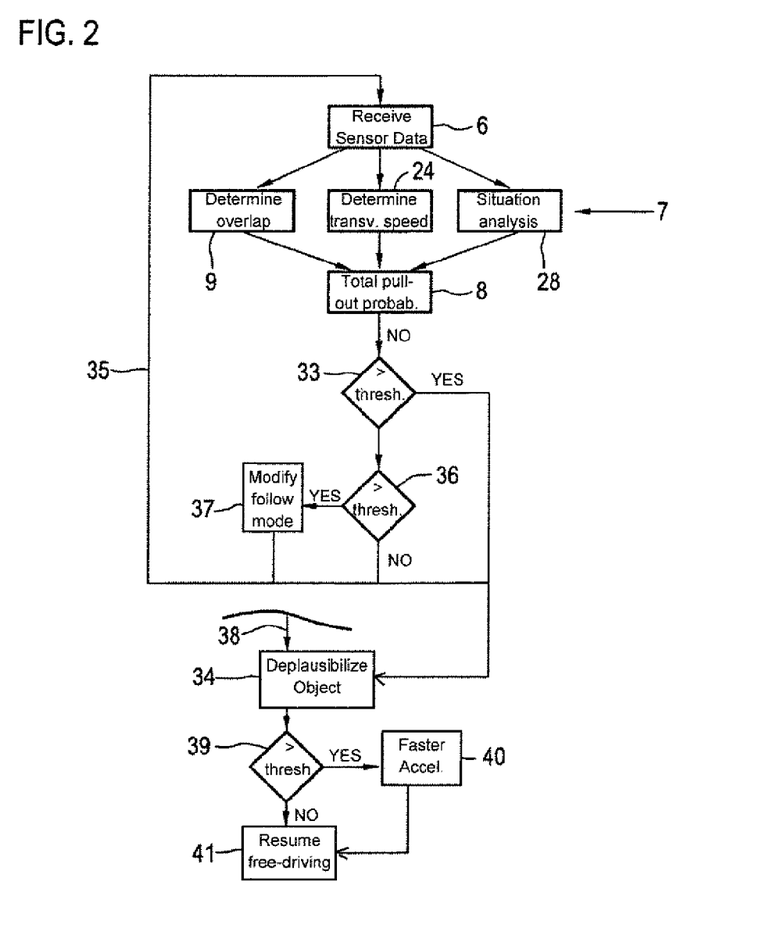
FIG. 2 a flow diagram for implementing the method according to the invention, FIG. 3 a schematic diagram for determining an overlap, FIG. 4 the dependence of the pulling-out probability on the overlap, FIG. 5 a schematic diagram for determining a predicted position, FIG. 6 a schematic diagram of possible traffic situations to be analyzed, and FIG. 7 a time-dependent profile of a pulling-out probability.

FIG. 2 shows a flow chart of an exemplary embodiment of the inventive method. At a step 6, the sensor data from the sensors, particularly of the radar sensors 4 and the camera 5, are received. These are then used in parallel with an algorithm 7 that determines a contribution to the pulling-out probability. In other words, in the present embodiment each of the algorithms 7 determines a partial pulling-out probability, wherein the individual pulling-out probabilities are then combined by addition, at step 8, to a total pulling-out probability. Of course, other logic processes to link different partial pulling-out probabilities are possible.

Figure 3:
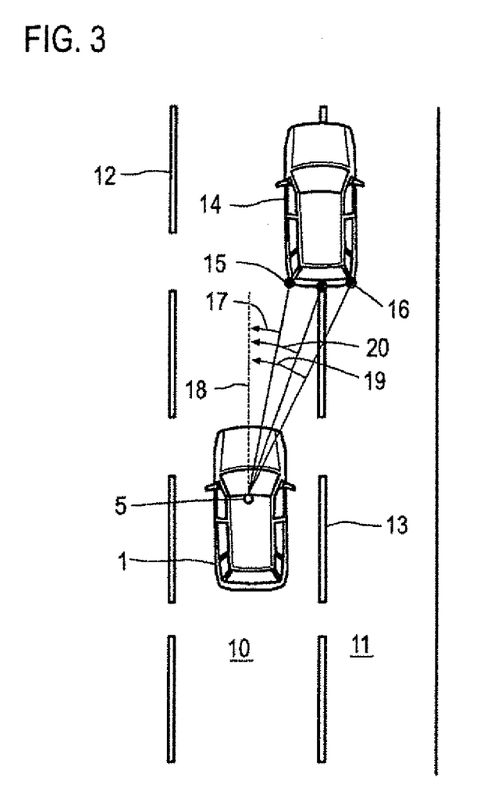

With respect to a first algorithm 7, at a step 9, the overlap of the control object with the current lane of the own vehicle 1 is taken into account for determining the pulling-out probability. It is first determined, in which lane the vehicle 1 is traveling and whether an adjacent lane exists into which the preceding vehicle could pull out, in right hand traffic into the right lane. For this purpose, data from the camera 5 can be considered, but also data from a navigation system that is not illustrated in FIG. 1 and other environment data, e.g. that a motor vehicle is just being passed or has been passed. The process for determining the overlap is illustrated in FIG. 3, which shows the motor vehicle 1 with the radar sensor 4 in its own lane 10. It has already been determined that an adjacent lane 11 exists. The own lane 10 is delimited by lane markers 12 and 13, which can be detected in the images captured by the camera 5. For example, the preceding vehicle 14 can be detected by using a Lidar sensor or the camera 5, in particular the two lateral rear edges 15, 16 of the preceding vehicle 14. An angle 17 describes the position of the edge 15 with respect to the direction of travel 18. An angle 19 describes the position of the edge 16 with respect to the direction of travel 18. When these two angles 17, 19 are known, for example from data from the camera 5 or a Lidar sensor, their difference is a measure of the width of the vehicle 14. An additional angle 20 which represents the position of the right lane marker 13 can now be determined from the video data (sensor data) captured by the camera 5. However, the angle corresponding to the difference of the angles 17 and 20 can also be calculated directly from the image from the camera 5 and from the beam angles of a Lidar sensor, When the angle 19 is greater than the angle 20, but the angle 17 is smaller than the angle 20, a partial overlap between the lane 10 and the vehicle 14 exists. The percentage of the overlap can be calculated by dividing the difference angle of the angle 17 of the left edge 15 and the angle 20 of the lane marker 13 by the difference angle of the two edge angles 17 and 19.

Figure 4:
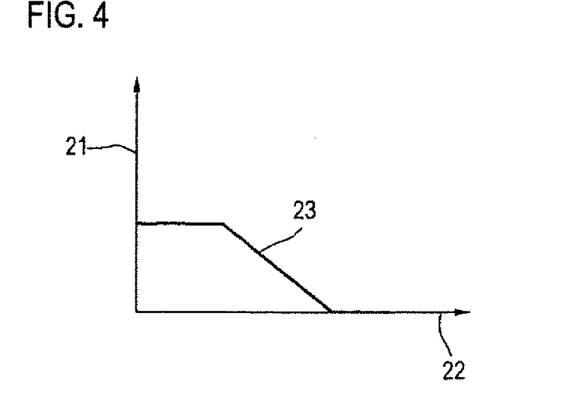

FIG. 4 illustrates in more detail how the pulling-out probability is determined from the overlap. The pulling-out probability is shown on an axis 21 as a function of the overlap on an axis 22. It is evident that partial pulling-out probability is assumed to be a linearly decreasing characteristic curve 23 as a function of the overlap. The pulling-out probability provided by this algorithm 7 is zero when the preceding motor vehicle is located completely inside the lane 10, and then increases linearly to a maximum value.

It should be noted here that instead of using the overlap, other embodiments are also possible wherein the approach to the lane marker 13, i.e. ultimately the difference of the angles 19 and 20, is considered directly for determining a pulling-out probability. It should also be noted that, since the aforedescribed calculation method also allows overlaps of more than 100% when the vehicle 14 is spaced from the lane marker 13, but is located entirely within the lane 10, the pulling-out probability can also be defined as assuming a value different from zero even when the vehicle 14 is still completely located inside the lane 10.

Another algorithm 7 used in this embodiment is performed at a step 24 and involves an analysis of a determined transverse speed of the preceding vehicle 14. This will be illustrated in more detail in FIG. 5. In this case, a most likely trajectory in form of a vehicle path 25 is used which then forms a selection criterion for determining the control object. A plausibility value describing a probability that the object is a control object is determined for the detected objects that are at least partially located within the vehicle path 25. This already existing functionality is now also being used to determine a pulling-out probability. It is evident in the example shown in FIG. 5 that the preceding vehicle 14 is still entirely within the vehicle path 25. However, it has a measurable transverse speed that can be measured with the environment sensors, as indicated by the arrow 26.

Figure 5:
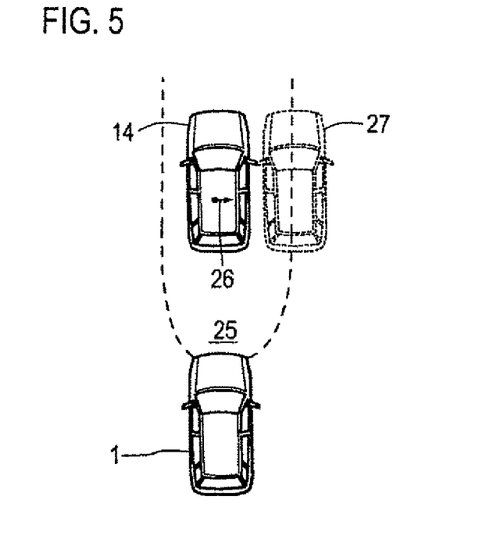

This determined lateral speed is now used to determine a predicted position 27 of the vehicle 14, which the vehicle 14 will have assumed after a predetermined time, for example several seconds. A plausibility value is then determined again for this predicted position 27. The difference of this plausibility value to 1 or 100% can now be viewed as a pulling-out probability, which enters in the present case only proportionally in the determination of the final pulling-out probability at step 8.

At step 28, a situation analysis is performed as a third algorithm 7. Once more, objects preceding the motor vehicle 1 are detected with the radar sensor 4 and/or the camera 5—as was the case in the plausibility check of the control object—, and their trajectory and/or the current position is evaluated with respect to a pulling-out probability, which will be described in more detail with reference to FIG. 6. As is evident, the motor vehicle 1 approaches the preceding vehicle 14 or is already in follow mode in relation to the vehicle 14 as a control object. Neither the own motor vehicle nor the vehicle 14 are hereby located traffic in the far right lane 11 for right hand, and instead are in this example again in lane 10. Several situations may now be considered as an indication of the pulling-out probability of vehicle 14. For example, the vehicle 14 may just have passed another road user 29. Within the context of the situation analysis, because the lane association is known from lane data and from the road user data of the detected objects, in particular the speed and position, are also known, this passing maneuver can be tracked. For example, when another road user 30 travels ahead of the road user 29, it cannot be assumed that the vehicle 14 will again pull in to the right after having passed the road user 29. However, when instead of the road user 30 a gap is detected that is large enough for the vehicle 14 to "make room", the situation analysis produces a pulling-out probability when the passing maneuver ends.

Figure 6:
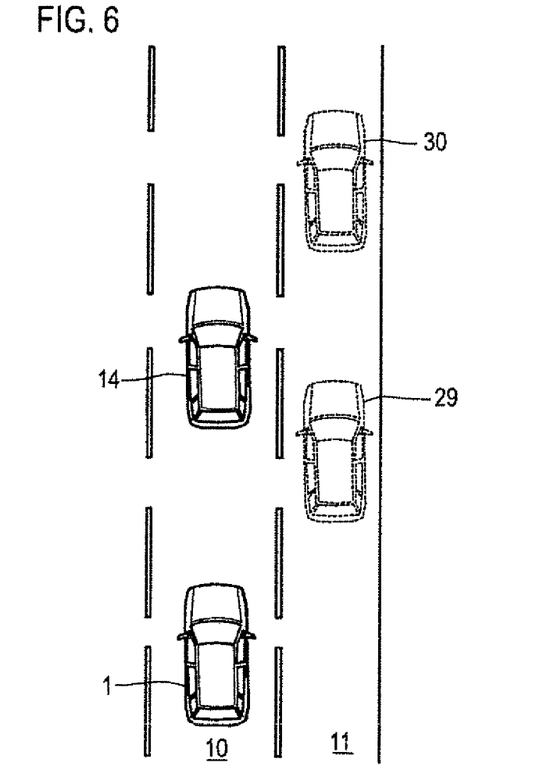

Such a situation also exists when neither the road user 29 nor the road user 30 are present, i.e. when the vehicle 14 travels, without motivation, in lane 10 instead of lane 11.

An identical, fixed pulling-out probability, in this example 50%, is now assigned to each of these situations—i.e. the conclusion of a passing maneuver and the first detection of the situation of driving on the left side without motivation. It should be noted here that the situation analysis may of course be more complex and a pulling-out probability may be specifically calculated or otherwise determined depending on the particular driving situation. Relevant is mainly that a lane assignment of the detected objects/road users and the own motor vehicle 1 is possible based on the sensor data from the environment sensors and the road user data.

Figure 7:
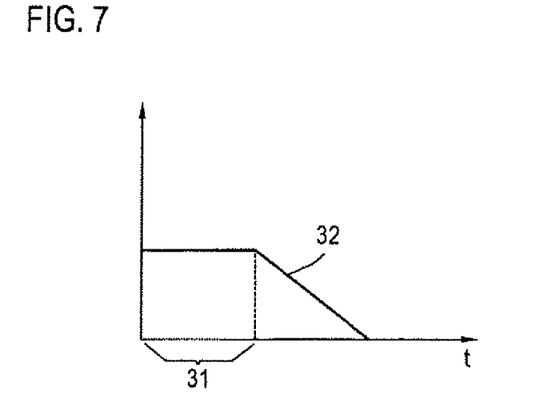

To include situations involving notorious left-lane drivers or preceding vehicles that do not want to use the gaps, the pulling-out probability determined with the situation analysis includes a time-dependent expiration. This is shown in FIG. 7 plotted against time. As can be seen, the pulling-out probability is kept constant over a predetermined period of time 31, here 3 seconds. Thereafter, the pulling-out probability is decreased via a ramp 32. This prevents faulty reactions to notorious left-lane drivers and the like.

As mentioned above, the partial pulling-out probabilities or individual pulling-out probabilities determined with the algorithms 7 are then combined into a final pulling-out probability at a step 8 and used to influence the operation of the driver assistance system 2.

For example, it is checked at a step 33, see FIG. 2, whether the final pulling-out probability exceeds a deplausibility threshold value, which in this embodiment is 80%. If this is the case, then the current control object is deplausibilized at a step 34 independent of the other plausibility, while at the same time the pulling-out probabilities are newly determined cyclically, arrow 35. If the pulling-out probability is smaller than a deplausibility threshold value, it is checked at step 36 whether the pulling-out probability exceeds a preparation threshold value which in the present example is 50%. If this is not the case, the pulling-out probability is determined again in the next cycle from the start, see arrow 35. However, if the pulling-out probability is greater than the preparation threshold value, then the follow mode is modified, in the present example by reducing a control distance to the preceding vehicle and by adding a positive acceleration value to an acceleration request calculated by the driver assistance system in the follow mode, wherein the reduction of the control distance and the acceleration value depend on the current distance to the preceding vehicle and the pulling-out probability and are selected so as to always prevent a collision. Thus, a passing maneuver, which begins with the final pulling-out (and thus deplausibilization) of the preceding vehicle, can be readied and then carried out faster and more dynamically.

Besides the deplausibilization according to step 34 and the modification of the follow mode according to step 37, the pulling-out probability can also be used to adapt the control in free-driving mode, immediately after the deplausibilization of the previous control object, which is explained in more detail in the lower part of FIG. 2.

When deplausibilization of the current control object occurs, either based on the check at step 33 or, as indicated by the arrow 38, for other reasons, it is checked at step 39 whether the pulling-out probability exceeds a situation threshold value. When this is the case, the control in free-driving mode is changed for a predetermined period of time at step 40 by requesting a faster change to an acceleration mode of the motor vehicle and increasing the acceleration request. This means that the gradients of the acceleration request can be made larger, and it can generally be accelerated faster so as to quickly complete a passing maneuver for the former control object.

Thereafter, the normal free-driving mode is assumed, step 41.

It should be noted at this point that a preconditioning of other vehicle systems with respect to a forthcoming and intended faster acceleration of the vehicle may be provided, particularly when a preconditioning threshold value for the pulling-out probability is exceeded. The operating parameters are thereafter adjusted accordingly.

The invention claimed is:

1. A method for operating a longitudinal driver assistance system of a motor vehicle, comprising:
controlling with the driver assistance system a speed of the motor vehicle in one of two modes: an exclusive follow mode so that a distance to a preceding vehicle representing a control object remains constant while the speed of the motor vehicle does not exceed a desired speed, and a speed of the preceding vehicle does not exceed the desired speed, and a free-driving mode at the desired speed, the method comprising:
when driving in the follow mode, determining a pulling-out probability of the preceding vehicle as a function of sensor data of at least one environment sensor, and
terminating the follow mode depending on the pulling-out probability, and
performing a situation analysis in relation to a passing maneuver of the preceding vehicle or in relation to the preceding vehicle traveling in front in a left lane for right hand traffic or in a right lane for left hand traffic, without motivation, and determining the pulling-out probability based on the situation analysis, and
wherein the situation analysis is performed based on road user data relating to at least one of a travel lane, a speed and a position of the motor vehicle with respect to other preceding road users, and
wherein the pulling-out probability is determined by taking into consideration an overlap between a lane actually travelled by the motor vehicle and the preceding vehicle, and
measuring a traverse speed of the preceding vehicle, and predicting a position of the preceding vehicle after a predetermined period of time, and determining the pulling-out probability by taking into account the predicted position, and
modifying control of the speed of the motor vehicle in relation to the preceding vehicle by
when the pulling-out probability exceeds a preparation threshold value and when the speed of the preceding vehicle is lower than the desired speed, at least one of reducing the distance to the preceding vehicle and adding a positive acceleration value to an acceleration request determined by the driver assistance system in the follow mode.

2. The method according to claim 1, wherein the follow mode is completed immediately when the pulling-out probability exceeds a deplausibility threshold value.

3. The method of claim 1, wherein the control distance is reduced or the positive acceleration value is added depending on at least one of a current distance to the preceding vehicle and the pulling-out probability.

4. The method of claim 1, wherein the situation analysis is performed by determining lane data regarding a lane actually travelled by the motor vehicle and a total number of lanes of a travelled road.

5. The method of claim 1, further comprising increasing the pulling-out probability or setting the pulling-out probability to a higher fixed value when the situation analysis indicates by considering a course of the position of the preceding vehicle and of at least one of the other preceding road users who has been passed or is being passed, that the preceding vehicle has completed a passing maneuver and is able to pull in again to the right into the right lane for right hand traffic or is able to pull in again to the left into the left lane for left hand traffic.

6. The method of claim 1 further comprising increasing the pulling-out probability or setting the pulling-out probability to a higher fixed value when the situation analysis indicates that the preceding vehicle travels in the lane of the motor vehicle in spite of an empty right lane for right hand traffic or an empty left lane for left hand traffic.

7. The method of claim 6, wherein the pulling-out probability is increased or set to the higher fixed value only for a predetermined period of time and is thereafter reduced again.

8. The method of claim 7, wherein the predetermined period of time is between about 2 and about 4 seconds.

9. The method of claim 7, wherein the pulling-out probability is reduced again via a ramp.

10. The method of claim 1, wherein the overlap is determined by measuring with a sensor arranged on the motor vehicle respective angles of two rear outer edges of the preceding vehicle and comparing the respective angles with an angle of a lane marker located at a distance from the sensor corresponding to a distance of the two rear outer edges from the sensor, wherein the angle of the lane marker is derived from a camera image.

11. The method of claim 1, wherein the pulling-out probability increases with decreasing overlap as an at least partially linear function.

12. The method of claim 1, wherein the position is a transverse position of the preceding vehicle.

13. The method of claim 1, wherein the predetermined period of time is between about 2 seconds and about 4 seconds.

14. The method of claim 1, further comprising
  determining a plausibility value for a detected preceding object based on a vehicle path,
  determining the control object based on the plausibility value, and
  determining a plausibility value for the predicted position, and
  determining the pulling-out probability based on the plausibility value for the predicted position.

15. A motor vehicle comprising:
  at least one environment sensor, and
  a longitudinal driver assistance system with a controller configured
  to control a speed of the motor vehicle in one of two modes: an exclusive follow mode so that a distance to a preceding vehicle representing a control object remains constant while the speed of the motor vehicle does not exceed a desired speed, and a speed of the preceding vehicle does not exceed the desired speed, and in a free-driving mode at the desired speed,
  when driving in the follow mode, to determine a pulling-out probability of the preceding vehicle as a function of sensor data from the at least one environment sensor, and
  to terminate the follow mode depending on the pulling-out probability, and
  to perform a situation analysis in relation to a passing maneuver of the preceding vehicle or in relation to the preceding vehicle traveling in front in a left lane for right hand traffic or in a right lane for left hand traffic, without motivation, and to determine the pulling-out probability based on the situation analysis, and
  wherein the situation analysis is performed based on road user data relating to at least one of a travel lane, a speed and a position of the motor vehicle with respect to other preceding road users, and
  wherein the pulling-out probability is determined by taking into consideration an overlap between a lane actually travelled by the motor vehicle and the preceding vehicle, and
  to measure a traverse speed of the preceding vehicle, and to predict a position of the preceding vehicle after a predetermined period of time, and to determine the pulling-out probability by taking into account the predicted position, and
  to modify control of the speed in relation to the preceding vehicle by
  when the pulling-out probability exceeds a preparation threshold value and when the speed of the preceding vehicle is lower than the desired speed, at least one of reducing the distance to the preceding vehicle and adding a positive acceleration value to an acceleration request determined by the driver assistance system in the follow mode.

* * * * *